Patented June 19, 1945

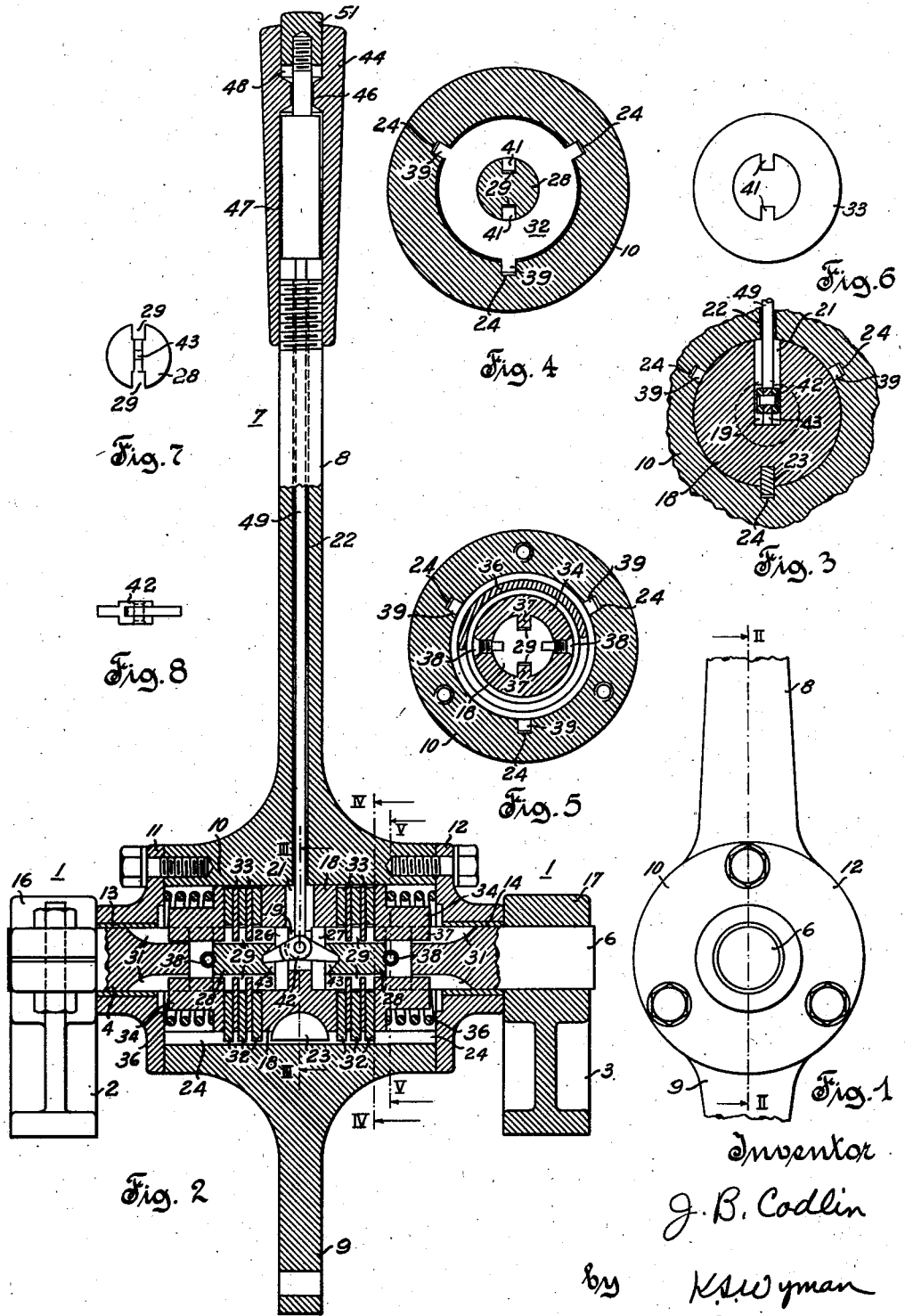

2,378,688

UNITED STATES PATENT OFFICE 2,378,688

THROTTLE LEVER

James B. Codlin, Springfield, Ill., assignor to Allis-Chalmers Manufacturing Company, Milwaukee, Wis., a corporation of Delaware Application March 31, 1943, Serial No. 481,316

14 Claims. (Cl. 74—531)

This invention relates generally to control apparatus and more particularly to the levers embodied in such apparatus for actuating and retaining control elements in selected positions.

Engine throttle levers and the like are usually constructed to embody a notched or serrated quadrant and a coacting releasable latching mechanism which permits the lever to be moved to and retained in any selected one of a plurality of predetermined positions. However, such constructions have not proven entirely satisfactory since even a quadrant with many serrations fails to provide an infinite number of possible settings, thereby frequently necessitating employing a setting which does not conform with either the speed or load requirements of the engine controlled thereby, and since if a quadrant having a large number of notches or serrations is employed, the notches or serrations, which must of necessity be made small, soon become worn sufficiently to render the coacting latching mechanism ineffective, particularly when applied to a structure which is subjected to considerable vibration and sudden jars, to retain the lever in a selected position.

It is therefore the primary object of this invention to provide an improved control apparatus embodying a lever or the like which is positionable in an infinite number of possible settings and which is effective at all times to positively retain the lever in any setting selected. In accordance with this invention, the previously stated object may be accomplished by apparatus embodying a lever mounted to turn on a fixed support, engageable clutch members including a first element non-rotatably fixed relative to said support and a second element carried by said lever for rotary movement therewith, and means controlling engagement of said coacting clutch members so as to permit a turning of the lever on said fixed support in order to position same in any selected one of an infinite number of settings and so as to retainably secure the lever on said fixed support in the setting selected.

Control apparatus embodying the invention may also include as features thereof correlations of elements which are of considerable practical importance and which render same extremely durable and cheap to manufacture, assemble and service. Accordingly, the invention also consists of the various details of construction, combinations of elements and arrangements of parts as is more fully set forth in the appended claims and in the detailed description, reference being had to the accompanying drawing, in which:

Fig. 1 is a partial end elevation of lever structure embodying the invention;

Fig. 2 is a section taken on line II—II of Fig. 1;

Fig. 3 is a partial section taken on line III—III of Fig. 2;

Fig. 4 is a section taken on line IV—IV of Fig. 2;

Fig. 5 is a section taken on line V—V of Fig. 2;

Fig. 6 is a side view of a non-rotatable disk;

Fig. 7 is an end view of the inner end of the toggle engaged element; and

Fig. 8 is a partial plan view of the toggle.

Referring to the drawing and particularly to Figs. 1 and 2, it is seen that the invention may be applied to control apparatus comprising a fixed support 1 consisting of spaced bracket or pedestal members 2 and 3 in which are fixedly mounted spaced opposed coaxial shaft parts 4 and 6, respectively, and a lever 7 having a handle portion 8, a linkage engaging portion 9, and an enlarged hollow cylindrical intermediate portion 10 coaxially surrounding said shaft parts and being rotatably mounted thereon by means of removable end cover members 11 and 12 embodying coaxial journal portions 13 and 14, respectively. Shaft parts 4 and 6 are fixedly clamped in the bracket or pedestal members 2 and 3 by means of removable cap elements 16 and 17, respectively, and in this connection, it should be understood that pedestal members 2 and 3 are in turn fixedly positioned, in any suitable manner, on or adjacent the structure to which the control apparatus is applied.

The hollow intermediate lever portion 10 has disposed centrally therein (see also Fig. 3) a clutch back plate member 18 having an opening 19 extending axially therethrough and an outwardly extending radial bore 21 which is of greater diameter and alined with the adjacent end of a bore 22 extending throughout the length of the lever handle portion 8; said back plate member being carried by said hollow portion to turn or rotate therewith and to move axially relative thereto by means of a key part 23 disposed in one of three coaxial slots 24 formed in the inner cylindrical surface of the hollow portion 10. The opposite ends of opening 19 in back plate member 18 are counterbored or otherwise enlarged to provide coaxial cylindrical portions 26 and 27 having a diameter approximately equal to the diameter of the spaced opposed ends of shaft parts 4 and 6, respectively.

Also disposed within the hollow intermediate lever portion 10 is a pair of cylindrical elements 28, one on each side of back plate member 18, which are substantially the same diameter as said shaft parts; said elements being mounted partially within the cylindrical counterbored portions 26 and 27 of back plate member 18 for axial movement relative thereto with their outer ends axially spaced from the ends of the opposed shaft parts 4 and 6 as shown. The elements 28 (see Fig. 7) and the inner end portion of the shaft parts 4 and 6 are provided with two identical diametrically opposed coaxial slots 29, 31, respectively. In addition, each end of the intermediate lever portion 10 includes therein a group of coacting clutch elements comprising a plurality of alternately arranged coaxial disks 32 and 33 surrounding each element 28, a coaxial pressure plate member 34 surrounding and bridging the end portion of each element 28 and the adjacent one of the opposed end portions of the shaft parts 4 and 6, and a coaxial spring 36 disposed between each pressure plate member 34 and the adjacent one of the end covers 11 and 12. Referring also to Fig. 5, it is seen that each pressure plate 34 is provided on its inner surface with a pair of diametrically opposed splines 37 which are disposed within the diametrically opposed alined slots 29 and 31 formed in the coacting element and shaft parts, respectively, and is provided intermediate its ends with a pair of inwardly extending projections or screws 38 adapted to engage the outer plain end of the adjacent element 28. Each disk 32 (see Fig. 4) has on its outer periphery a plurality (three in this instance) of spaced projections or tabs 39 disposed within the three coaxial slots 24 formed in the inner cylindrical surface of lever portion 10 and each disk 33 (see Figs. 4 and 6) has on its inner periphery a pair of diametrically opposed projections or tabs 41 disposed within the coaxial slots 29 formed in the coacting element 28. It should now be obvious that the disks 32 and 33 are mounted for axial movement relative to the elements 28, relative to the shaft parts 4 and 6, and relative to the lever portion 10; that the disks 32 are in fact carried by and rotate with the lever portion 10; that since each element 28 is connected to the adjacent one of the fixed shaft parts 4 and 6 by means of the splines 37 on the coacting pressure plate 34, the elements 28 may be moved axially but not rotated relative to the shaft parts 4 and 6 and relative to the back plate member 18; that therefore the disks 33 are non-rotatably carried by the elements 28; and that the size of the radial bore in the back plate member 18 and its key and slot positioning means permit an axial movement of the back member which is sufficient and effective to automatically equalize the pressure exerted on opposite sides thereof by the action of the springs 36 and pressure plates 34.

Referring to Figs. 2, 3 and 8, it is seen that back plate member 18 includes therein a toggle member 42 disposed within the central portion of opening 19, that toggle member 42 has the outer end of its oppositely extending pivotally connected portions engaged with the inner recessed ends 43 of the elements 28, that the outer end of handle portion 8 of lever 7 is provided with an enlarged removable grip member 44 having a bore 46 extending longitudinally therethrough and forming a continuation of the previously mentioned bore 22, that bore 46 has counterbored or otherwise enlarged inner and outer portions 47 and 48, respectively, that a rod 49 extends through the bores 46 and 22 in the handle portion 8 and through the radial bore 21 in back plate member 18 with its inner end bearing against the midportion of toggle 42, thereby acting to spread said toggle and move elements 28 axially away from back plate member 18 and against the inwardly projecting screws 38 on pressure plates 34, that a portion of the rod 49 which is disposed within the inner counterbored portion 47 of bore 46 is enlarged or otherwise weighted to maintain its inner end in continuous engagement with toggle member 42, and that the outer end of rod 49 which terminates within the outer counterbored portion 48 of bore 46 is provided with an enlarged removable button portion 51 which projects a short distance beyond the end of grip member 44.

With the various parts in the positions shown, the springs 36 are acting to maintain the disks 32 and 33 compressed between the coacting pressure and back plates with sufficient force to prevent a turning movement of the lever on the shaft parts 4 and 6, irrespective of sudden jars and the degree of vibration to which the fixed support is subjected. Springs 36 also act to maintain pressure plates 34, elements 28, toggle 42 and rod 49 in continuous engagement and in the position shown. Therefore, when it is desired to change the setting of the lever, the operator merely presses on the button portion 51 on rod 49, which moves the rod inward to effect a further spreading of toggle member 42 which in turn effects an axial movement of elements 28 and pressure plates 34 away from back plate member 18, thereby releasing the pressure on disks 32 and 33. Lever 7 can now be readily turned on the fixed support to any desired setting, and when thus moved, the operator releases button portion 51 whereupon the springs 36 effect an axial movement of pressure plates 34 and elements 28 toward back plate member 18, a closing movement of toggle 42 and an outward movement of rod 49 to the position shown. This results in disks 32 and 33 being firmly compressed between the pressure and back plates with sufficient force to retain the lever in the setting selected.

In this connection, the dimensions of the pressure plates, disks and back plate, the number of disks employed, and the spring force can readily be determined and embodied in a compact, durable construction which can be readily installed and serviced with a minimum of time and expense. In addition, it should now be obvious that apparatus embodying the invention permits the lever to be readily positioned and firmly held in any selected one of an infinite number of settings.

The invention is applicable to all types of control apparatus embodying a lever for actuating and retaining control elements in selected positions, and although the invention has been disclosed in connection with a type of lever particularly adapted for controlling the throttle valve on an engine driven vehicle, it should be understood that it is not intended to limit the invention to the exact details of construction herein shown and described, as various modifications coming within the scope of the appended claims may occur to persons skilled in the art.

It is claimed and desired to secure by Letters Patent:

1. Control apparatus comprising a fixed support, a lever rotatably journaled on said support, engageable clutch members including a first member carried by said lever for rotary movement therewith and a second member non-rotatably carried by said support for movement toward and away from said first member, means acting to maintain said clutch members engaged with sufficient force to prevent said lever from turning on said support, and selectively operable means on said lever controlling engagement of said clutch members.

2. Control apparatus comprising a fixed support, a lever having a hollow portion rotatably journaled on said support, engageable clutch members disposed within said hollow portion and including a first member rotatable with said hollow portion and a second member non-rotatably carried by said support for movement toward and away from said first member, means continuously acting to maintain said members engaged with sufficient force to prevent said hollow portion from turning on said support, and means including a part selectively operable from the exterior of said lever for controlling the engagement of said members.

3. Control apparatus comprising a fixed support, a lever having a hollow portion rotatably journaled on said support, a back plate member disposed within and carried by said hollow portion for movement therewith and for axial movement relative thereto, a clutch element non-rotatably mounted within said hollow portion on each side of said back plate member for axial movement relative thereto, means acting to frictionally engage each clutch element with the opposed side surface of said back plate member with sufficient force to prevent a turning movement of said hollow portion on said fixed support, and means including a part selectively operable from the exterior of said lever controlling frictional engagement of said clutch elements with said back plate member.

4. Control apparatus comprising a fixed support, a lever having a hollow portion surrounding and being rotatably journaled on axially spaced portions of said support, a back plate member disposed within and carried by said hollow portion for movement therewith, a group of coaxial clutch elements mounted within said hollow portion for axial movement relative thereto with one element of said group rotatable with said hollow portion and with another element of said group non-rotatably fixed therein, biasing means frictionally engaging said group of clutch elements with the opposed side surface of said back plate member with sufficient force to prevent a turning movement of said hollow portion on said fixed support, and means including a part selectively operable from the exterior of said lever and a coacting part disposed within said hollow portion controlling frictional engagement of said groups of clutch elements with said back plate member.

5. Control apparatus comprising a fixed support, a lever having a hollow portion rotatably journaled on said support, a back plate member disposed within and carried by said hollow portion for movement therewith, a group of coacting clutch elements mounted within said hollow portion adjacent said back plate member for movement toward and away therefrom with one element of said group rotatable with said hollow portion and with another element of said group non-rotatably fixed therein, biasing means frictionally engaging said group of clutch elements with the opposed side surface of said back plate member with sufficient force to prevent a turning movement of said hollow portion on said fixed support, and means including a part selectively operable from the exterior of said lever controlling frictional engagement of said groups of clutch elements with said back plate member.

6. Control apparatus comprising a fixed support, a lever having a hollow portion surrounding and being rotatably journaled on axially spaced portions of said support, a back plate member disposed within and carried by said hollow portion for movement therewith, a group of coaxial clutch elements mounted within said hollow portion on each side of said back plate member for axial movement relative thereto with one element of each group rotatable with said hollow portion and with another element of each group non-rotatably fixed therein, biasing means frictionally engaging each group of clutch elements with the opposed side surface of said back plate member with sufficient force to prevent a turning movement of said hollow portion on said fixed support, and means including a part selectively operable from the exterior of said lever and a coacting part disposed within said hollow portion controlling frictional engagement of said groups of clutch elements with said back plate member.

7. Control apparatus comprising a fixed support, a lever having a hollow portion surrounding and being rotatably journaled on axially spaced portions of said support, a back plate member disposed within and carried by said hollow portion for movement therewith and for axial movement relative thereto, a group of axially movable clutch elements disposed within said hollow portion on each side of said back plate member, means including said hollow portion rendering at least one element of each group rotatable with said hollow portion and rendering at least another element of each group non-rotatably fixed therein, biasing means frictionally engaging each group of clutch elements with the opposed side surface of said back plate member with sufficient force to prevent a turning movement of said hollow portion on said fixed support, and means including a part selectively operable from the exterior of said lever and a coacting part carried by said back plate member controlling frictional engagement of said groups of clutch elements with said back plate member.

8. Control apparatus comprising a supporting structure presenting spaced opposed coaxial shaft parts, a lever having a hollow portion surrounding and being rotatably journaled on remote portions of said shaft parts, a back plate member disposed between the ends of said shaft parts and being carried by said hollow portion for movement therewith, a group of axially movable clutch elements including coacting rotary and non-rotary disks disposed within said hollow portion on each side of said back plate member for axial movement relative to said hollow portion and back plate member, biasing means frictionally engaging each group of clutch elements with the opposed side surface of said back plate member with sufficient force to prevent a turning movement of said hollow portion on said shaft parts, and means including a part selectively operable from the exterior of said lever and a coacting part carried by said back plate member controlling frictional engagement of said groups of clutch elements with said back plate member.

9. Control apparatus comprising a supporting structure presenting spaced opposed coaxial shaft parts, a lever having a hollow portion surrounding and being rotatably journaled on said shaft parts, a back plate member disposed between the ends of said shaft parts and being carried by said hollow portion for movement therewith, a group of axially movable clutch elements disposed within said hollow portion on each side of said back plate member, means including said hollow portion rendering at least one element of each group rotatable with said hollow portion and rendering at least another element of each group non-rotatably fixed therein, biasing means frictionally engaging each group of clutch elements with the opposed side surface of said back plate member with sufficient force to prevent a turning movement of said hollow portion on said shaft parts, and means including a part selectively operable from the exterior of said lever and a coacting part carried by said back plate member controlling frictional engagement of said groups of clutch elements with said back plate member.

10. Control apparatus comprising a fixed support, a lever having a hollow portion surrounding and being rotatably journaled on axially spaced portions of said support, a back plate member disposed within and carried by said hollow portion for movement therewith, a coaxial pressure plate non-rotatably mounted adjacent each side of said back plate member for axial movement relative to said back plate member and relative to said fixed support, a group of coaxial clutch disks interposed between each pressure plate and the opposed side surface of said back plate member, means mounting said groups of disks for axial movement relative to said back plate member with at least one disk of each group rotatable with said hollow portion and with at least another disk of each group non-rotatably fixed therein, biasing means acting on said pressure plates and being effective to compress said groups of disks between said pressure and back plates with sufficient force to prevent said hollow portion from turning on said fixed support, means including a toggle interconnecting and establishing a motion transmitting relation between said toggle and pressure plates, and means exterior of said hollow portion for actuating said toggle to simultaneously effect an axial, disk-compressing releasing movement of said pressure plates.

11. Control apparatus comprising a supporting structure presenting spaced opposed coaxial shaft parts, a lever having a hollow portion surrounding and being rotatably journaled on remote portions of said shaft parts, a pressure plate surrounding and being non-rotatably carried by each shaft part for axial movement relative thereto, a hollow back plate member spacedly interposed between the ends of said shaft portions and being carried by said hollow portion for movement therewith, an axially movable element spacedly interposed between the end of each shaft portion and the opposed side surface of said back plate member, a group of disks surrounding each of said elements and including a first disk non-rotatably carried by said element for axial movement relative thereto and a second disk carried by the surrounding hollow portion for movement therewith and for axial movement relative thereto, biasing means acting on said pressure plates and being effective to compress said groups of disks between said pressure and back plates with sufficient force to prevent said hollow portion from turning on said shaft parts, means including a toggle disposed within said back plate member interconnecting and establishing a motion transmitting relation between said toggle, elements and pressure plates, and means exterior of said hollow portion for actuating said toggle to simultaneously effect an axial, disk-compressing releasing movement of said pressure plates.

12. Control apparatus comprising a fixed support, a lever having a hollow portion rotatably journaled on said support, a first clutch member disposed within and carried by said hollow portion for movement therewith, a second clutch member non-rotatably fixed relative to said support, means rendering said second member movable into and out of a degree of engagement with said first member effective to prevent said lever from turning on said support, and selectively operable means controlling engagement of said clutch members.

13. Control apparatus comprising a fixed support, a lever having a hollow portion rotatably journaled on said support, a back plate member disposed within and carried by said hollow portion for movement therewith, a clutch element non-rotatably mounted adjacent each side of said back plate member for axial movement relative thereto, means acting to engage each clutch element with the opposed side surface of said back plate member with sufficient force to prevent a turning movement of said hollow portion on said fixed support, and selectively operable means controlling engagement of said clutch elements with said back plate member.

14. Control apparatus comprising a fixed support, a lever having a hollow portion rotatably journaled on said support, a back plate member disposed within and carried by said hollow portion for movement therewith, a clutch element non-rotatably mounted within said hollow portion on each side of said back plate member for axial movement relative thereto, means acting to engage each clutch element with the opposed side surface of said back plate member with sufficient force to prevent a turning movement of said hollow portion on said fixed support, and selectively operable means controlling engagement of said clutch elements with said back plate member.

JAMES B. CODLIN.